United States Patent Office 3,544,456
Patented Dec. 1, 1970

3,544,456
DREDGING PROCESS
Donald Y. Shanfelt, Sunnyvale, and Robert A. Douglas, Palo Alto, Calif., assignors to Calgon Corporation, Pittsburgh, Pa.
No Drawing. Filed Sept. 18, 1968, Ser. No. 760,702
Int. Cl. B01d 21/01
U.S. Cl. 210—54                                6 Claims

ABSTRACT OF THE DISCLOSURE

In a dredging process wherein silt and water are removed from the floor of a body of water and pumped to a barge or other container to be transported, an improvement is effected by adding to the silt-water mixture a water-soluble polymeric flocculating agent, which causes the silt to settle more quickly and compactly, permitting a more efficient continuous removal of relatively clear water from the barge.

BACKGROUND OF THE INVENTION

Polymeric coagulating agents and flocculating agents have been used in the past to settle solid materials suspended in water. See, for example, Hronas U.S. Pat. 3,066,095. They have also been added to flowing streams to modify the bed of a natural watercourse (Katzer & Pye U.S. Pat. 3,118,832) and to remove accumulations of alluvium in man-made water systems (Flock U.S. Pat. 3,288,640).

So far as we are aware, however, they have not been used to improve a dredging operation.

In the dredging technique of which our invention is an improvement, the dredging tool is provided with a pump for applying suction to the silt or alluvium slurry which is loosened from the floor of the body of water being treated. The suspension is transported upwards and directed into a barge or other container for settling of the silt. The relatively clear water on top is pumped or drained off the barge. As soon as the barge is filled with settled silt, it is moved out to be dumped. The settling process can be quite time-consuming, however, and often the barge is moved prior to full settling because the water removed from the top contains too much silt.

SUMMARY OF THE INVENTION

We have found that substantial time-saving benefits can be realized by adding a water-soluble polymeric flocculating agent to the silt suspension prior to or during the settling process.

In an actual test on a dredge operating in Mare Island Strait, the average volume of settled solids in a load was increased 46% through the use of only 5 p.p.m. polymer. The average yardage without polymer was 1,804 cubic yards; that with 2.5 p.p.m. polymer was 2,202 cubic yards; and with 5.0 p.p.m. the average load was 2,634 cubic yards. The particular polymer used in this test was a cationic condensation polyamine described in U.S. Pat. 3,391,090, having a molecular weight of about 10,000. Details of the test are set forth in Table I.

TABLE I.—IMPROVEMENT OF DREDGE EFFICIENCY WITH POLYMERS

| Day | Load No. | Pumping time, min. | Yardage without polymer | Yardage with addition of polymer | |
|---|---|---|---|---|---|
| | | | | 2.5 p.p.m. | 5.0 p.p.m. |
| Monday: | | | | | |
| | 1 | 21 | 1,578 | | |
| | 2 | 20 | | 1,830 | |
| | 3 | 20 | 1,830 | | |
| | 4 | 20 | | 2,076 | |
| | 5 | 20 | 1,830 | | |
| | 6 | 20 | | | 2,700 |
| Tuesday: | | | | | |
| | 7 | 20 | 1,950 | | |
| | *8 | 20 | | | 2,820 |
| | 9 | 20 | 1,830 | | |
| | 10 | 20 | | | 2,448 |
| Total | | | 9,018 | 6,606 | 5,268 |
| Average | | | 1,804 | 2,202 | 2,634 |
| Average increase, 398 cu. yd. | | | | 398 | 830 |

*Load No. 8 reached full load (3060 cu. yds.) at 15 minutes pumping time. Continued pumping to 20 minutes and lost 240 cu. yds. overboard.

It may be observed from the above Table I that the use of polymer requires no additional time. Consequently the increase in cubic yards moved results directly in an economic improvement.

We may use any water soluble synthetic cationic or anionic polyelectrolyte in our invention. Suitable polymers having molecular weights of at least 5,000 include polyacrylamide, preferably hydrolyzed up to about 40%, copolymers of acrylamide with copolymerizable monomers such as acrylic acid, acrylonitrile, diacetone acrylamide, other N-substituted acrylamides, etc., sulfonated polystyrene, polyethyleneimine, polymers of diallyl quaternary ammonium monomers (Butler U.S. Pat. 3,288,770), polymers including other quaternary ammonium groups such as those substituted acrylamides discussed in U.S. Pat. 2,810,713, incorporated herein by reefrence. Preferred anionic polymers are the homopolymers of acrylamide hydrolyzed to the extent of about 10–40% of their amide groups. Preferred cationics are polyethyleneimine, the homopolymer of dimethyl diallyl ammonium chloride, and condensation polyamines made by (as in U.S. Pat. 3,391,-

090) reacting, by weight of the final polymer (a) about 50% to 80% short chain polyalkylene polyamine of the general formula $$NH_2[(CH_2)_mNH]_nH$$

with (b) about 10% to 30% non-gem alkyl dihalide of the general Formula $X(CH_2)_pX$, and then reacting the reaction product thereof with (c) about 10% to 20% $\alpha,\beta$-epoxyhalide of the general formula $$CH_2\underset{O}{-\!\!\!-\!\!\!-}CH-CH_2X$$

where $m$ is an integer from 2 to 4, $n$ is an integer of at least 4, $p$ is an integer from 2 to 4, and X is selected from the group consisting of chlorine and bromine.

Concentrations of from 1 p.p.m. to 100 p.p.m. of polyelectrolyte (based on the slurry inroduced to the barge) having a molecular weight of at least 5,000 will provide improvement, although on the lower end of the range it will be minimal and at the higher end, the treatment will tend to be uneconomical. Concentrations of 1–25 p.p.m. are preferred; however, we do not mean to be limited to any specific range of concentrations, since we consider any effective amount to be within the scope of our invention.

Our invention is applicable to any suction hopper or pipeline dredge wherein the silt or suspended matter is directed into a barge or other depository for settling and to be moved to another location.

We claim:

1. In a method of dredging wherein a suspension of solid particulate matter is placed in a barge for removal, the improvement comprising increasing the settling rate of the solid particulate matter in the barge by adding to said suspension on the barge an effective amount of a water-soluble polyelectrolyte having a molecular weight of at least 5,000.

2. Method of filling a barge with silt from a dredging process in which a suspension of silt is pumped at a substantially constant rate into the barge, comprising improving the rate of settling by adding to the suspension substantially continuously as it is pumped into the barge, about 1 to about 100 p.p.m. of a water-soluble synthetic polyelectrolyte having a molecular weight of at least 5,000.

3. Method of claim 2 in which water substantially free of suspended silt is removed from the barge at a substantially constant rate throughout the addition of polymer.

4. In a method of dredging employing a suction hopper, in which a silt suspension is added to a vessel for transporting, the improvement effecting an increase in the solids/liquid ratio in the vessel comprising adding to said silt suspension continuously as it enters said vessel from about 1 to about 25 p.p.m. of a synthetic water-soluble polyelectrolyte having a molecular weight of at least 5,000, permitting the floc formed thereby to settle in a compact mass, and simultaneously removing from the vessel water substantially free of silt.

5. Method of claim 4 in which the polyelectrolyte is polyacrylamide hydrolyzed to the extent of 10–40% of its amide groups.

6. Method of claim 4 in which the polyelectrolyte is a condensation polyamine made by reacting, by weight of the final polymer (a) about 50% to 80% short chain polyalkylene polyamine of the general formula $$NH_2[(CH_2)_mNH]_nH$$

with (b) about 10% to 30% non-gem alkyl dihalide of the general formula $X(CH_2)_pX$, and then reacting the reaction product thereof with (c) about 10% to 20% $\alpha,\beta$-epoxyhalide of the general formula $$CH_2\underset{O}{-\!\!\!-\!\!\!-}CH-CH_2X$$

where $m$ is an integer from 2 to 4, $n$ is an integer of at least 4, $p$ is an integer from 2 to 4, and X is selected from the group consisting of chlorine and bromine.

References Cited

UNITED STATES PATENTS

| | | | |
|---|---|---|---|
| 1,551,657 | 9/1925 | Goeriz | 37—58 |
| 3,118,832 | 1/1964 | Katzer et al. | 210—54 |
| 3,470,091 | 9/1969 | Budd et al. | 210—7 X |

MICHAEL ROGERS, Primary Examiner

U.S. Cl. X.R.

37—195